Aug. 17, 1965 J. RABINOW 3,201,751

OPTICAL CHARACTER READING MACHINE WITH A PHOTOCELL MOSAIC EXAMINING DEVICE

Filed June 6, 1961 2 Sheets-Sheet 1

INVENTOR
Jacob Rabinow

BY Joseph A. Genovese & Max L. Libman

ATTORNEYS

Aug. 17, 1965 J. RABINOW 3,201,751

OPTICAL CHARACTER READING MACHINE WITH A PHOTOCELL MOSAIC EXAMINING DEVICE

Filed June 6, 1961 2 Sheets-Sheet 2

INVENTOR

Jacob Rabinow

BY Joseph A. Genovese & Max L. Libman

ATTORNEYS

United States Patent Office 3,201,751
Patented Aug. 17, 1965

3,201,751 OPTICAL CHARACTER READING MACHINE WITH A PHOTOCELL MOSAIC EXAMINING DEVICE

Jacob Rabinow, Bethesda, Md., assignor, by mesne assignments, to Control Data Corporation, Minneapolis, Minn., a corporation of Minnesota Filed June 6, 1961, Ser. No. 115,267
23 Claims. (Cl. 340—146.3)

This invention relates to reading machines and particularly to character identity machines.

The reading machine art has developed to a stage where a number of successful machines have been demonstrated. The machines function on a wide variety of operating principles; and it has been shown that exceedingly powerful and versatile machines may be constructed. However, the cost of such machines is high.

The main objective of my invention is to provide an inexpensive, reliable and fast reading machine. The low cost aspect of my reading machine is emphasized because cost prohibitions are realistic factors in commercial acceptance of character reading machines for some services.

My present invention is not the first attempt to construct a character reading machine at a reasonable cost. My U.S. Patent No. 2,933,246 discloses a principle on which a successful reading machine was constructed. The cost of the machine was comparatively low, however, the machine was not as fast as my presently proposed machine.

Most successful reading machines have a scanner by which the character (or usually, its image) is examined on a part-by-part basis. My prior patent illustrates one type of scanner, and at the filing date of that patent, other types of optical scanners were well known. My present invention does not scan the character in the usual sense of the word, where "scanning" means a sequential examination of the elements of a character. Consequently, a considerable quantity of timing and scan information storage equipment is completely eliminated.

Instead of scanning in the usual way, my present reading machine simultaneously examines all subareas (making up the total area) of the character. This is more like the character examination disclosed by C. J. Fitch in U.S. Patent No. 2,682,043. However, where Fitch was interested in identifying characters of different shapes through an analysis process, my present invention provides a reading machine which processes the data regarding the characters in a completely different way, basically relying on an electronic "map matching" technique.

Although it is possible to examine the characters as their images (or the scanner) moves in any direction, i.e. horizontal, vertical, etc., for the purpose of explaining the operation of my invention it is assumed that the characters move horizontally. Briefly summarizing the nature of my invention, I have a character examination device capable of exercising certain control functions to minimize the problem of "vertical" registration and to provide "read" trigger signals for the determination of the identity of the characters. Heretofore, corresponding features which function with any degree of accuracy, entailed quite elaborate electronic circuits. A simple, inexpensive examination device meeting these specifications is a mosaic of photosensitive cells having some assigned the duties of detecting character mis-register, and these plus others detecting the end (or beginning) of the character, i.e. the clear white space between adjacent characters of a line.

Assuming that the character image moves horizontally over the examination device, my invention has means connected with the photocells at specific locations for determining the presence or absence of elements of the unknown characters. The outputs of the various photocells are averaged and fed in parallel to inexpensive storage devices, for example a single capacitor for each character that is to be recognized. The charges applied to the capacitors are proportional to the outputs of the photocells of the "single look" scanner. If the character image being examined has portions in the gray scale and other portions black, the capacitor charges will reflect these differences. Therefore the capacitors function as analog storage devices, that is, the charges are proportional to the value of the input signals. The term "analog" therefore, is distinguished from "digital" and possesses the advantage of storing some information, however small, when the character being examined has parts that are not printed "black" but rather are pale, i.e. in the gray scale.

When it is certain that the character image has been in full view of the investigation device, my invention provides a "read" trigger signal to trigger a selection circuit of a comparator. There will be a single output from the comparator identifying the character whose memory capacitor has the "best," e.g. the highest change.

The examination device of my invention provides an output signal which inhibits an attempt to identify a mis-registered character. The mis-register signal is on a character-for-character basis. Therefore my reading machine can examine an entire line of characters and identify all of the characters that are in full view of the examination device. Then, the same line may be re-examined at a slightly raised or slightly lowered position to identify the originally mis-registered characters. Examples of devices capable of successively sweeping the image of a character across an examination device are found in Patent No. 3,104,422.

A variation of my invention allows for considerable tolerance in vertical registration by having two, three, four or more groupings of character element-examination photocells, and individual signal summarizing matrices and capacitors for each. Continuing with the assumption that the characters move horizontally, the groupings of character element-examination photocells would simply combine to form a vertically larger mosaic of photocells, as will be described in more detail later.

Another feature of my invention is the use of the "assertion" and "negation" technique in combination with this non-scanning reading machine. In terms of the character itself, an assertion may be defined as an output signal generated as a result of the discovery of a character feature, line, element, etc., at a position where it is expected. A "negation" is an output indicating that there is no character feature, line, element, etc., in a given location when none is expected at that location. My invention also takes advantage of the "weighted position" technique which simply assigns more weight to an assertion or a negation in order to emphasize the importance of the presence or absence of a character element in a given location. Although assertion, negation and weighted position techniques are described in Patent No. 3,104,370, the use of such techniques in combination with mosaic examination and analog storage as in this case, makes it possible for me to achieve one of the main objectives of the invention, and that is to provide an inexpensive, reliable and fast reading machine.

Other objects and features of importance will become apparent in following the description of the illustrated forms of the invention which are given by way of example only.

FIGURE 1 is a diagrammatic view showing a typical character examination device for a 3 x 5 character.

FIGURE 1*a* is a view showing a few characters of a font known as a "match stick" font wherein all of the characters are constructed of a few elements as described later.

Figures 2, 3, 3A, 5, 8:
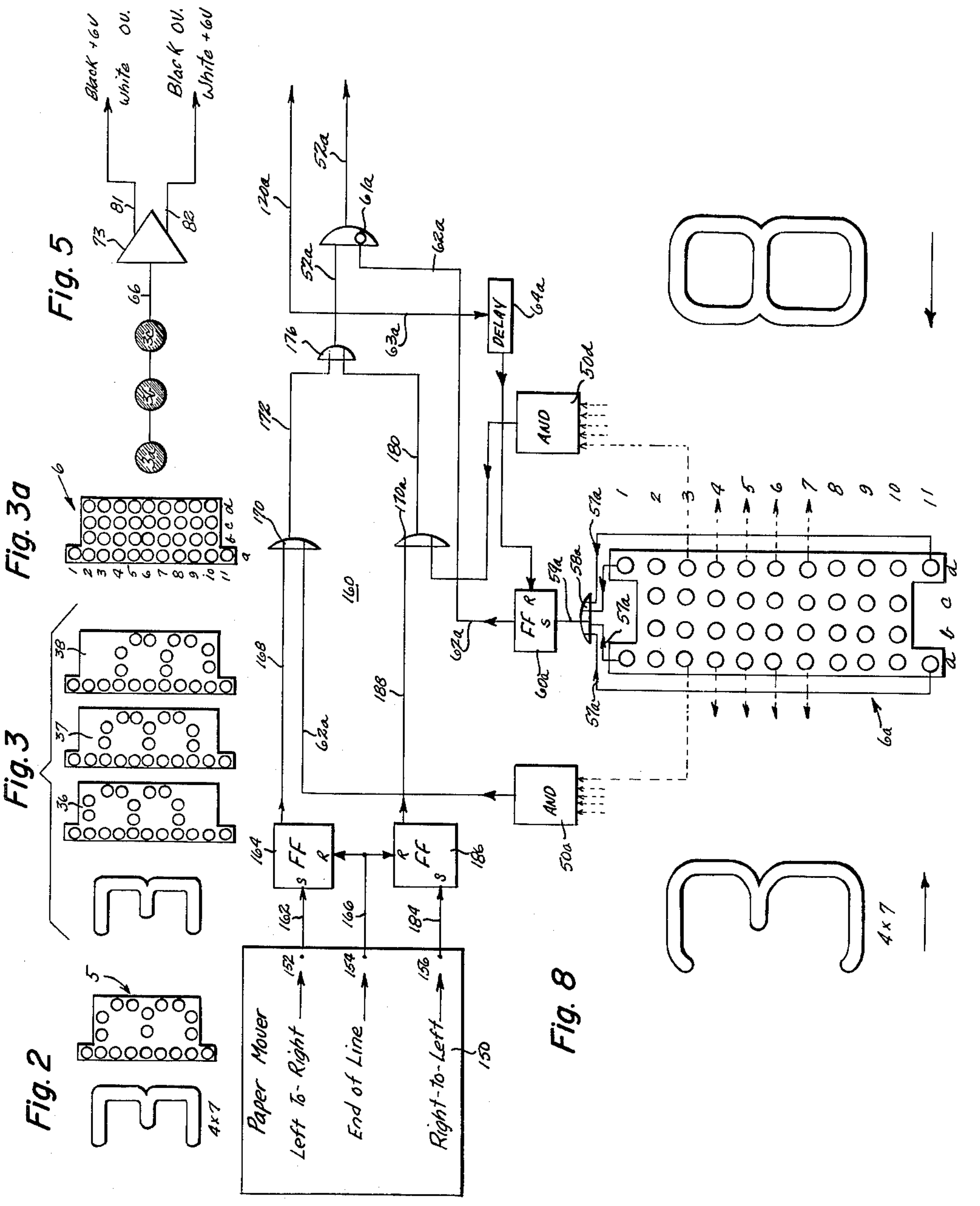
FIGURE 2 is a diagrammatic view similar to FIGURE 1 but showing the examination device for a 4 x 7 character.
FIGURE 3 is an exploded perspective view showing individual examination devices with separate groupings of photocells, each grouping vertically spaced from each other to provide tolerance for vertical mis-registry.

FIGURE 3*a* is a diagrammatic view of a photocell mosaic examination device which includes the separate groupings shown in FIGURE 3, combined to form a single mosaic.

Figures 4, 6, 7:
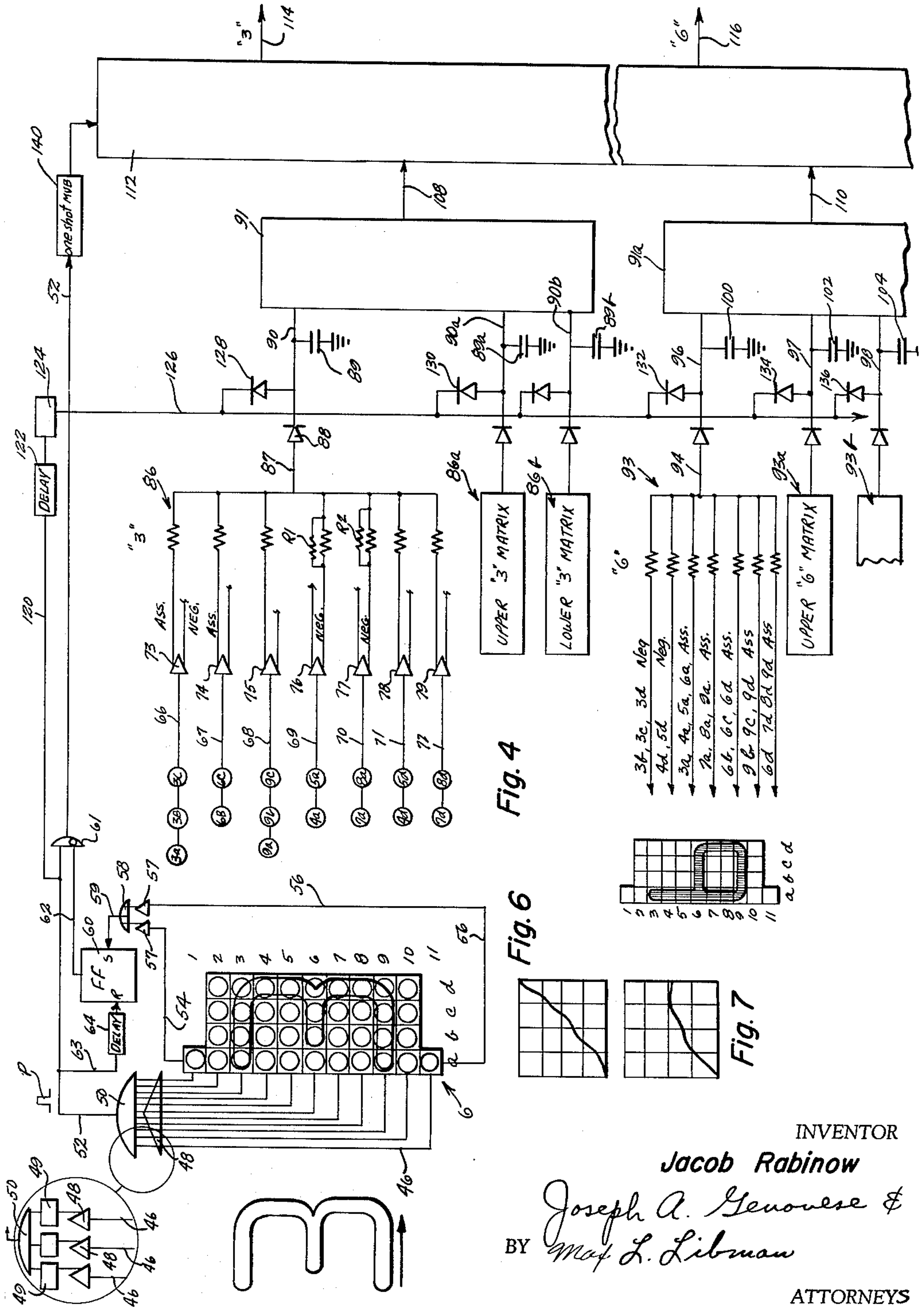

FIGURE 4 is a schematic view showing the mosaic of photocells of FIGURE 3*a* and a wiring diagram illustrating one embodiment of my reading machine.

FIGURE 5 is an enlarged diagrammatic view to explain the philosophy of assertions and negations.

FIGURE 6 is a graph showing the build up of capacitor charge as the character "3" image is moved horizontally across the examination device, the capacitor in question being the one for the numeral "3" recognition circuits.

FIGURE 7 is a graph showing the capacitor charge build up for the "6" recognition circuits when the image of the numeral "3" passes horizontally over the character investigation device.

FIGURE 8 is a schematic view showing a modified examination device and associated circuitry for a form of the invention which is particularly useful when lines of data are examined from left to right and/or right to left.

The term "match stick" font was mentioned previously. This expression is adopted because of the analogy between constructing numerals 0–9 inclusive by arranging match sticks to form the characters. All of the numerals and many of the letters of our alphabet may be constructed with seven elements (match sticks) so arranged that the characters are easily distinguishable from each other both by the human being and machine. The term "3 x 5 font" and the like means only that the characters are so proportioned, i.e. five units high and three wide. Although much of the following description relates to a reading machine capable of identifying "match stick" characters, it is to be clearly understood at the outset that my invention is not restricted to any given font or fonts. Recognition of the characters of any language or the many fonts used in English-speaking countries is merely a matter of increasing the resolution of my machine and recovering more data from the single examination of each character, and using it.

Figures 1, 1A:
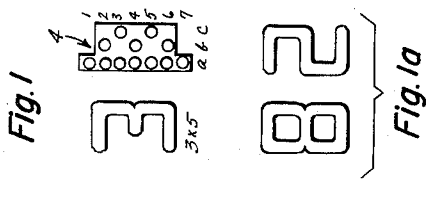

FIGURES 1, 2 and 3*a* show examination devices 4, 5 and 6 respectively, composed of photocells represented by circles. In practice, the photocells may be of any suitable shape. If simple characters are used, for instance the "match stick" font as shown in FIGURE 1*a*, the examination devices 4, 5 or 6 will have the photocells arranged in patterns, as shown, providing for the necessary information recovery. Note that with the match stick font, all that is required for character identity is an investigation of three horizontal and four vertical stations since all of the elements of all of the characters in question will fall within these stations, but of course, in different permutations and variations to form the various characters. In each of these figures it may be assumed that the character image is projected from a document onto the examination device, and that the document (and consequently its image) is moveable while the examination device is at rest. Obviously, the reverse may be true, or both the document and the examination device may move relative to each other.

Inasmuch as my invention performs functions at the examination device which are performed by much more complex circuits in other machines (such as shift registers and control circuits in Patent No. 3,104,639), devices 4, 5 and 6 are discussed first. For the 3 x 5 font (FIGURE 1) there are three vertical columns *a*, *b* and *c* and seven horizontal rows 1–7 inclusive of photosensitive areas, for instance photocells. Column *b* contains photosensitive areas in rows 2, 4 and 6. Column *a* contains photosensitive areas in all of the rows, while column *c* contains photocells in rows 3 and 5. Therefore when an image of the character is in full view of the examination device 4, the image (and its background) is examined in these corresponding places. The intelligence gathered by the examination device at these locations is processed by the circuits (described later) to identify the character. The only difference between FIGURES 1 and 2 is found in the proportions of the character and in the photocell arrangement of the examination device. However, the examination is made along vertical and horizontal stations which would correspond to those described in detail in connection with FIGURE 1. Examination device 6 is a complete mosaic (FIGURE 3*a*) and it is constructed of vertically displaced, separate groupings of photocells as shown in FIGURE 3. The purpose of such an arrangement is to provide tolerance for vertical misregistry of the character as its image is being examined.

The problem of vertical registration is critical and very difficult in many types of machines. I actually provide more than one solution to this problem. One is to have separate groupings of photocells vertically spaced from each other by one unit as shown in FIGURE 3 but combined to form the single mosaic examination device 6 (FIGURE 3*a*). Another solution to the problem is to provide two photosensitive cells at the top and bottom of the first column and to assign them the function of inhibiting determination of the character if either of these cells "sees black" (part of the character image). The cells referred to are cells **1*a* and 11*a*** respectively of FIGURE 3*a* and FIGURE 4. When cells **1*a* and/or 11*a*** detect a part of the character image, the machine determines that the character is mis-registered, and does not attempt to identify that character.

It is not unusual for a reading machine to develope a "read" trigger signal when the machine detects the clear white space between characters. Accordingly, I use column *a*, photocells 1–11 inclusive to detect the clear white space between characters and thereby develope a "read" trigger signal for the recognition circuits of my machine. In addition, these same cells are information gathering cells since they are also connected with the recognition circuits of the machine. The may my circuitry is arranged, as the image of a character moves across the cells in column *a*, the examination device and storage means of the reading machine function, but final decision is not triggered until all parts of the character move horizontally past this row of photocells. Consequently, I am assured that all features of the unknown (examined) character (in a horizontal dimension) were in the field of view at the examination device before a read trigger signal is developed. For additional assurance I can arrange my logic circuitry to require that column *a* sees "white" while either or both columns *b* or *c* sees "black" at at least one or two of its areas before a read trigger signal is developed. This is, however, an optional feature.

Consider now FIGURE 4 in more detail. Examination device 6 is made of four vertical columns *a*, *b*, *c* and *d* of photocells which are eleven-units high. In keeping with the example shown in FIGURES 3 and 3*a*, the character being investigated is only seven-units high and four-units wide. Since photocells **1*a* and 11*a* are vertical registration photocells (and two of the elevent "read" trigger photocells) the data gathering mosaic is actually nine-units high and four wide. The separate groupings shown in FIGURE 3 are actually superimposed to form the examination device 6, and it will be apparent that there are additional photocells in the examination device 6**. These may be used for greater resolution, and I have shown them to indicate further that my present invention is not restricted to a "match stick" font or any other single font. For the front shown in FIGURE 1*a*, only a few photocells are actually required, and these are reproduced to the right of examination device 6 in FIGURE 4. Obviously, the number of required photocells is small because the characters are all defined by a few elements. For a font such as an ordinary typewriter font, many of the characters are defined by curved lines or curved lines plus straight lines. To recognize the characters of such a font more photocells will be required. However to explain the principle of my invention, FIGURE 4 discloses the essential parts of a machine for identifying the 4 x 7 match stick font characters having essentially straight features.

Photocells 1 thru 11 in column *a* serves a dual function as briefly referred to herein before; (a) nine of them gather character information and (b) all eleven of them are responsible for producing a read trigger signal. Function (b) is described first. As the character image moves horizontally to the right it is detected first by column *a* of photocells whose outputs are conducted on wires 46 and applied to amplifiers 48 ahead of AND gate 50. Each amplifier 48 (diagrammatically shown as a single amplifier) provides a digital output signal to AND gate 50 when the photocells in column *a* detect no part of the character image (i.e. when all of the photocells in column *a* see "white"). Amplifiers 48 provide digital pulses at their outputs when the photocells see "white" by being quantizing amplifiers or by using any standard circuit technique such as an analog-to-digital converter or by having one-shot multivibrators 49 interposed between amplifiers 48 and AND gate 50. (See enlargement at upper left of FIGURE 4.) As the character image sweeps across column *a*, the photocells which see apart of the character image (black) will provide no outputs, and those photocells which see "white" (portion of the character background) will produce outputs. The AND gate 50 requires all of its inputs to be satisfied before a read trigger signal appears on the output line 52 of AND gate 50. Thus photocells 1–11 of column *a* seek the clear white space between characters of a line in order to provide a "read" trigger signal. The information gathering function of cells 2–10 in column *a* is described later.

The vertical registration photocells 1*a* and 11*a* provide an output on line 54 or 56 if either detects a portion of the character image. If the character is vertically misregistered, a mis-register signal, amplified at 57, is applied to OR gate 58 whose output on line 59 sets flip flop 60. The output line 62 of the flip flop is an inhibit input to gate 61 whose other input is the "read" trigger signal on line 52. There is delay 64 in line 63 to allow the inhibit signal on line 62 to serve its purpose before the flip flop is reset. Thus, even though all inputs to gate 50 may be satisfied by the cells of column *a* of device 6 seeing a clear white space between characters, if the character in the field of view of the examination device is mis-registered, the read trigger signal on line 52 will be inhibited at gate 61. Flip flop 60 is re-set by the "read" signal conducted on line 63 (through delay 64), line 63 being connected to line 52 ahead of gate 61.

The following summary covers those features which have been described in detail to this point. In FIGURE 4, assume that the image of the character 3 shown at the extreme left is moving in the direction of the arrow toward the examination device 6. The vertical elements on the right side (as shown) of the character image will be projected onto photocells 4*a*, 5*a*, 7*a* and 8*a*. At least portions of photocells 3*a*, 6*a* and 9*a* will detect portions of the image, but notice that the corners of the character have been rounded for the sake of a more pleasing appearance, and therefore, the photocells 3*a*, 6*a* and 9*a* may be only partially covered by the image. In any event, if any one of the photocells in column *a* detects a portion of the character image there will be no corresponding output to function as one of the required inputs for AND gate 50. Consequently, there is no read signal developed on line 52. Then as the character image moves to the right on the examination device, photocells 3*a* and 9*a* detect a portion of the character image, continuing to maintain AND gate 50 disabled. When the character image is in full view of the examination device 6, photocells 3*a* and 9*a* will still be covered by a portion of the image. Then, as the character image continues to move, all photocells in column *a* will be uncovered, i.e. see no part of the character image. Thus, column *a* sees the clear white space between characters. At that moment (all photocells seeing "white"), the AND gate 50 has all of its inputs satisfied so that it provides an output signal. To simplify the disclosure herein, it is assumed that the output is a digital pulse *p*. Thus, the signal on line 52 is conducted to gate 61 and allowed to "pass" to trigger the comparison circuits of my machine.

Assume that the character image is a little high or a little low as it sweeps across the face of the examination device 6. If the image is within a predetermined tolerance, for instance one-unit high or one-unit low this amount of tolerance is permissible in view of the three separate groupings of photocells (see FIGURE 3) which permit this much vertical tolerance. This will care for a great deal of ordinary print mis-registry. However, if the character is so badly out of line that photocells 1*a* or 11*a* detect a portion of the character, I do not want the recognition circuits to attempt to identify the misregister character. Consequently, an output on line 54 sets flip flop 60 which provides an inhibit signal to gate 61 as described before. Thus, when the photocells of column *a* next see the clear white space between characters, the output of gate 50 on line 52 is still inhibited at gate 61, and the signal on line 52 cannot pass beyond gate 61. By using an image sweeping procedure as in Patent No. 3,104,422, the lines of characters (and thus each character) are moved vertically (as oriented in FIGURE 4 herein) slowly or in small steps. Each line of characters is examined one or more times. Thus, all of the characters of a line will eventually register well (as shown in FIGURE 4) with the examination device.

Attention is now directed to the right side of FIGURE 4 and FIGURES 5–8 inclusive. The right side of FIGURE 4 shows a number of photocells identified in accordance with position in examination device 6. It is understood that in practice conductors will extend from all of the photocells of the examination device, but to avoid crowding of the drawing, the examination photocells such as 3*a*, 3*b*, 3*c*, 6*b*, 6*c*, etc., are reproduced separately with their column-row identity. The examination area defined by photocells 3*a*, 3*b* and 3*c* provide outputs on line 66 to an inverting amplifier 73. The amplifier 73 can provide digital outputs, for instance by quantizing above a given level and operating a one-shot multivibrator, but there are advantages to an analog system which I show in the drawings. One advantage is that of economy, and another is that an analog system (output proportional to the input) automatically takes into account gradations of gray scale of the character. Where the digital system decides whether an elemental subarea of a character image is sufficiently "black" to be called a part of the character and neglects the signal if it is not at or above a predetermined level, an analog system will provide a signal proportional to the optical density of the character image.

The inverting amplifier 73 provides two outputs for a single input signal (FIGURE 5); thus, amplifier 73 has output lines 81 and 82 (FIGURE 5). The output on line 82 is the mirror image of the output on line 81, i.e. the outputs swing around an arbitrary signal reference. When the photocells connected to line 66 see "black" assume that the output on line 81 is a positive value, for instance +6 volts. At the same time, the output on line 82 will be zero volts, in which case the artificial reference is +3 volts. On the other hand, if the photocells connected with line 66 see "white" (part of the character background) the values on the lines are reversed. With the photocells seeing "white" the output on line 81 will be zero volts while the output on line 82 will be +6 volts. Obviously, any artificial reference about which the voltages swing may be selected. Now consider the logic implicit in this arrangement of outputs from amplifier 73. When the photocells, e.g. photocells *3a*, *3b* and *3c* of FIGURE 5, see a part of the character, we have an assertion voltage of +6 and a negation voltage at zero. When the photocells see a part of the character background in a given location, e.g. at positions *3a*, *3b* and *3c*, the output on line 81 is zero volts and the output on line 82 is +6 volts. By using this technique which is more fully discussed in Patent No. 3,104,370, my invention is capable of distinguishing between characters which would be otherwise very difficult to distinguish. For example, the character 8 when superimposed on a character 3 completely covers the outline of the "3" in some print. Thus, if no negations were made when an 8 is examined, the recognition circuit for the "3" would be completely satisfied along with the recognition circuit for the character "8." This would confuse the machine. However, by using negations for areas such as *4a*, *5a* and *7a*, *8a* of FIGURE 4, the logic circuit for the character "3" requires that there be no part of a character image at the two critical left vertical element positions. I use another technique to assure proper recognition. This technique is called "weighted position" and assigns greater importance to the presence or absence of certain features in a given location. Continuing with the example of the "3" and "8" I can "weight" the position corresponding to photocells *7a* and *8a* in my correlation circuits, which are described later.

Inasmuch as recognition of the characters of a simple font, such as the match stick font, requires investigation of only seven element-positions, I require only seven photocell groups and seven amplifiers 73–79 inclusive. The wiring connections between the photocells at the significant character-element stations are indicated at 66–72 inclusive. Selected output wires of the amplifiers are connected with correlation matrix 86 which functions to summarize the assertion and negation outputs that have been chosen for a given charactcer. Resistor matrix 86 sums the selected output of amplifiers 73–79 which are connected as follows: In the example given for the numeral "3" we would expect to see a part of the character image (black) at positions *3a*, *3b*, *3c* and *6b*, *6c* and *9a*, *9b*, *9c* and *4d*, *5d*, and *7d* and *8d*. We expect to see the background (white) at positions *4a*, *5a* and *7a*, *8a*. Thus the negation wires of amplifiers 76 and 77 are connected to resistors of matrix 86, whereas the assertion wires of all other amplifiers are connected with the other resistors of the matrix. To establish a weighted position the value of the resistors or resistor in question is altered. For instance, positions *4a*, *5a* and *7a*, *8a* are important in determining that the character "3" is not an 8. Therefore the resistance at these points in the resistor matrix can be decreased in proportion to the values of the other parallel connected resistors in the matrix 86. The decrease in resistor value is indicated by the double resistors R1 and R2 respectively.

The output of matrix 86 is applied on line 87 through a unidirectional device, e.g. diode 88 to a storage capacitor 89 or the equivalent for the numeral "3." The capacitor charge appears at line 90 and is applied to a comparator 91 which can be identical to the comparator disclosed in Patent No. 3,104,369. Some of the details of this comparator will be described later, however, at present it is noted that the function of the comparator is to accept a plurality of input signals, e.g. the signal on lines 90, 90a and 90b, and select the highest signal to provide an output identifying the character.

The character "3" as shown appears on the examination device 6 (FIGURE 4) between photocell rows 3–9 inclusive. If it were higher, it would fall between rows 2–8 and if it were lower it would fall between rows 4–10. Consequently, the character "3" would be recognized by the upper "3" matrix 86a, capacitor 89a, line 90a assembly, or the lower assembly including resistor matrix 86b, capacitor 89b, line 90b, etc. The upper and lower matrices 86a and 86b are identical to matrix 86. They differ only in that they are connected with different photocells of examination device 6, i.e. a grouping which is vertically spaced one unit higher and one unit lower than the grouping for resistor matrix 86. This technique provides considerable mis-register tolerance before cells 1a or 11a will reject the character. Of course, cost is increased as compared to using a smaller matrix of photocells, but the particular parts duplicated are comparatively inexpensive.

Matrix 93 together with upper and lower matrices 93a and 93b are for the character "6." The selection of amplifier outputs for the matrix 93 is shown by legends. The output lines 96, 97 and 98 from the three "6" matrices have storage capacitors 100, 102 and 104 associated therewith. Lines 96, 97 and 98 from input lines for the comparator section 91a. It is understood that for all other characters, additional matrices, storage capacitors, etc. are used.

The section 91 of the comparator shown herein is constructed the same as FIGURE 12 of the Glauberman Patent No. 2,932,006, or it corresponds to the portion of the comparator dealing with $A^{1}$, $A^{11}$ and $A^{111}$ in FIGURE 3 of Patent No. 3,104,369, whereas section 91a corresponds to the section in FIGURE 3 of the latter patent dealing with $Z^{1}$, $Z^{11}$ and $Z^{111}$. Lines 108 and 110 correspond directly to a line connected with tie point $71a^{1}$ in FIGURE 3 of the last mentioned patent. The final comparison section 112 corresponds directly to the final comparison section shown in FIGURE 3 of Patent No. 3,104,369. Thus, when the comparator makes a character identification, one of the output lines, e.g. line 114, 116, etc., will produce a signal identifying the unknown character.

FIGURES 6 and 7 show curves approximating the charging voltage of capacitors 89 and 100 respectively, as the character "3" moves across the examination device 6. The charging voltage for the "3" from matrix 86 is shown in FIGURE 6, and the charging voltage on the matrix 93 for the "6" as the character "3" moves across the face of device 6 is shown in FIGURE 7. At the instant that a read trigger signal occurs, the "3" image having just been located on examination device 6 in the position shown in FIGURE 4, produces the highest capacitor charging voltage, even though earlier the "6" matrix (FIGURE 7) might have provided a higher output voltage. Since the comparator selects the peak capacitor charge that has been stored therein, it is apparent that line 114 will yield a signal identifying the character as a "3."

The read signal on line 52 serves two purposes. Line 120 connected to line 52 ahead of inhibit gate 61 is delayed at 122 and used to trigger a multivibrator 124 or flip flop which shunts all of the memory capacitors to ground. If the charging voltage on the memory capacitors 89, 89a, etc., is positive, the capacitors may be discharged to ground when a mis-register signal appears on line 52, i.e. a read signal inhibited at gate 61, or after the comparator has made a decision as to the identity of the character. This is the reason for the time delay 122. The multivibrator 124 is mentioned only to show a means for providing a heavy signal of a polarity opposite to that of the charging voltage of the capacitors so that they are pulled down more quickly. Line 126 is connected to multivibrator 124 (or a flip flop shunted to ground) and to each of the memory capacitors by way of individual diodes 128, 130, 132, etc. Another function of the "read" signal on line 52 is to trigger the comparator so that it interrogates each of the memory capacitors and makes a decision regarding the identity of the unknown character. Again referring to Patent No. 3,104,369, the read trigger signal line 52 would correspond to trigger line 82 of FIGURE 3 therein. Again, since the signal on line 52 is merely a digital pulse, it may be used to operate an appropriate multivibrator 140 interposed in line 52 ahead of the comparator.

The previously mentioned Patent No. 3,104,224 discloses a number of techniques for back-and-forth line scanning. These are incorporated herein by reference to simplify this application. The main point is that my present machine can examine a line of data one or more times either left to right or right to left or both. FIGURE 8 discloses an embodiment (herein) where the lines of data may be processed regardless of the direction of examination of the line. An economical way of practicing this phase of the invention is to require a second examination of the line in the opposite direction when one or more characters of a line have not been identified in the first examination.

Copending application Serial No. 90,724, of Rabinow and Fischer entitled "Line Reading Machine," filed on February 21, 1961, discloses a paper mover with means providing a signal when the lines are examined from left to right, right to left and at the end of the line. There are other disclosures of means to provide signals such as these, for example U.S. Patent No. 3,170,139. Suitable mechanisms and circuits are diagrammatically represented at 15 herein, and the respective terminals having the above signals available are indicated at 152, 154 and 156 respectively. Character image examination device 6*a* is to be considered in connection with device 6, noting that columns *a*, *b* and *c* are identical. The upper and lower mis-register cells 1*a* and 11*a* plus their amplifiers 57*a* are identical to the corresponding cells in FIGURE 4, and the same holds true for OR gate 58*a*. Two more mis-register cells 1*d* and 11*d* are added, however, and the outputs of their amplifiers 57*a* are connected to OR gate 58*a*. AND gates 50*a* and 50*d* plus their amplifiers and wiring connections (partially shown in dotted lines) connect with the cells of row *a* and of row *d* and correspond to the AND gate 50 of FIGURE 4. The objective is to have the information "read" trigger cells of row *a* and the guard cells 1*a* and 11*a* function exactly like the corresponding cells in FIGURE 4 when the character image moves in one direction, for instance left to right. In addition, the guard cells 1*d* and 11*d* and the combined information "read" trigger cells of row *d* are to function in the same way when the character is moving in the opposite direction, i.e. right to left.

Logic circuit 160 is essentially an "OR" circuit governed by the outputs on terminals 152 and 156 respectively. Assume that the character image "3" is moving left to right as shown in FIGURE 8. Line 162 connected to terminal 152 will set flip flop 164. This flip flop is not reset until there is a signal on line 166, signifying the end of a line of characters. The output line 168 of flip flop 164 is one of two inputs to AND gate 170 whose output on line 172 provides a "read" signal corresponding to the signal on line 52 of FIGURE 4. The other input of AND gate 170 is on line 62*a* from AND gate 50*a*. When gate 50*a* is satisfied, i.e. cells of row *a* see the white space between characters, gate 170 is satisfied providing a read signal on line 52*a* by way of OR gate 176. However the read signal is not available to trigger the comparator (FIGURE 4) or discharge the memory capacitors if guard cells 1*a* and 11*a* have detected a mis-register of the character. In such a case OR gate 58*a* will provide an output on line 59*a* which sets flip flop 60*a*. The inhibit line 62*a* from flip flop 60*a* provides an inhibit signal to inhibited AND gate 61*a* interposed in the read signal trigger line 52*a*. Line 52*a* (corresponding to line 52 of FIGURE 4) is the output of OR gate 176 whose inputs are the "read" trigger lines 172 and 180 respectively. Yet, line 120*a* connected with line 52*a* ahead of inhibited gate 61*a*, makes available the read trigger signal for restoring the capacitors to an initial condition. Flip flop 60*a* is reset by the read signal on line 52*a* by way of line 63*a* through delay 64*a*, just as in FIGURE 4.

Consider now examination of the line of data in the opposite direction, that is right to left. Terminal 154 provides a signal on line 166 which resets flip flop 164 and flip flop 186. The flip flop 186 becomes set by a signal on line 184 which is connected with terminal 156, i.e. the terminal which provides an output when the examination is "right to left." The output of flip flop 186 conducted on line 188 to an AND gate 170*a* which is identical to gate 170. The output of gate 170*a* provides a signal on line 180 which is OR gated at 176 with any signal which may appear on line 172. Since we are assuming a right-to-left scan motion, flip flop 164 will not be set and therefore no signal should occur on line 172.

Should either guard cell 1*d* or 11*d* provide a mis-register signal, it will be conducted from gate 58*a* over line 59*a* to set flip flop 60*a* as described previously. Thus, the read trigger signal will be available on line 52*a* at the connection of line 120*a* therewith, but it cannot pass gate 60*a* to trigger the comparator. Accordingly, we have a simple "OR" circuit 116 which switches in one function of cells of row *a* (read signal generating) and guard cells 1*a* and 11*a* when a left-to-right signal is available at terminal 152. The circuit 116 switches off these guard cells and the non-information gathering function of cells of row *a* when a right-to-left signal is available at terminal 156. At the same time it switches in a corresponding function for cells 1*d*, 11*d* and the other cells of row *d*.

It is understood that various modifications, changes and other variations falling within the scope of the following claims may be resorted to.

I claim:

1. In a reading machine, an examination device having a field of view across which an unknown character passes, means continually providing analog intelligence outputs from said device as said character passes, analog storage means for each of a plurality of characters to be identified, analog correlation means responsive to said outputs for impressing signals on said storage means corresponding to the intelligence outputs for predetermined groupings of the areas of said examination device, a portion of said intelligence-output-providing means also constituting means responding to the full occupancy of the character in said field view to provide a trigger signal, and means responding to said trigger signal to interrogate each storage means and yield a signal which identifies the storage means having the optimum stored signal at the time of said trigger.

2. The machine of claim 1 and means at said examination device for inhibiting character identity if the character is mis-registered with the groupings of said examination device.

3. The machine of claim 2 and means to restore said storage means to an initial condition in response to said inhibiting of the character identity by said inhibiting means.

4. The machine of claim 2 wherein said unknown character is a single character of a line of characters which may be moved alternately in one direction and/or the opposite direction for reading the characters of the line, additional trigger signal providing means and inhibiting means for the characters as they move in one direction, and the first mentioned trigger signal providing means and inhibiting means being for the characters as they move in the opposite direction.

5. The machine of claim 4 wherein said trigger signal producing means are at the leading and trailing edges of said examination device.

6. A character reading machine comprising means including first and second partially overlapping groupings of photocells arranged as a single mosaic, for optically examining all of the elemental areas of a character and its background and for providing outputs indicating the presence of character elements in predetermined regions of said mosaic, means to amplify said outputs and provide pairs of signals for each of said outputs, each pair of signals including a first signal of a value corresponding to its character element examination output and a second similarly corresponding signal, said first and second signals being of equal strength above and below a reference respectively to establish an assertion signal and a negation signal respectively, a plurality of correlation matrices for the characters, more than one matrix being associated with each character and with said first and said second photocell groupings, selected assertions and negations being conducted to said matrices whereby each matrix and its assertion and negation input signals have the effect of seeking character features in given element areas, and the background in other given element areas, said matrices having output wires on which voltages become available, said voltages corresponding to the degree of correspondence between the input signals to the matrices and the particular character configuration represented by the connections between matrices and the assertion and negation conductors, storage means connected to said matrices output wires, and means to interrogate said storage means for an optimum signal therefrom.

7. The machine of claim 6 and means associated with said examining means for providing a signal indicating that the character has been fully in the view of said examining means and providing a trigger signal for said interrogation means.

8. The machine of claim 7 and means to inhibit the said trigger signal if the character is out-of-register with both of the photocell groupings of said examining means.

9. In a character reading machine having recognition circuits, an examination device comprising a mosaic made of a plurality of separate photosensitive devices, each producing an output in response to the optical density of a character and background being examined for continually examining the character as it sweeps across the field of view of the examination device, analog means connected with the outputs of said photosensitive devices to detect features and elements of the characters, or the background of the character which provides the intelligence that the character in said field of view has no feature at a given location, photosensitive means forming a part of said examination device and also detecting the space between separate characters to provide a read signal for said circuits, and means initiated at said examination device for inhibiting the read signal in response to character mis-register with said examination device.

10. The machine of claim 9 wherein said recognition circuits include analog storage devices for the characters, said analog storage devices being continually exposed to the outputs of said examination device, a comparator for continually inspecting said storage devices, and said comparator being triggered by the read signal so that a character decision is made on a basis of the examination device outputs after the character has been completely registered with said examination device.

11. A character reading machine for characters whose images are moved horizontally, said machine comprising an examination device having a field of view across which the image of an unknown character passes, said examination device including a grouping of photosensitive devices providing outputs corresponding to the detection of a portion of the character image or a portion of the background of the character image, said outputs being distinguishable from each other, means responsive to said outputs for providing assertion and negation signals which respectively signify the presence of a character element where it is expected, and the presence of a portion of the character background where it is expected, analog means for uniquely combining said signals for different characters to provide a character identification signal voltage which changes as the character image sweeps across said examination device in accordance with the degree of match of the character image and the unique combination of assertion and negation outputs, storage means for said signal voltages, a comparator operatively associated with each of said storage means to select the optimum voltage and provide an output which identifies the unknown character. means initiated at said examination device for providing and enabling trigger signal to said comparator after the character image has been in full view of the examination device, and means also initiated at said examination device for inhibiting the actuation of said comparator in response to vertical mis-registry of the character image on said examination device and for restoring said storage means to an initial condition.

12. The reading machine of claim 11 wherein said examination device further includes a second grouping of photosensitive devices providing second outputs as aforesaid in connection with said first-mentioned grouping, to provide tolerance for character-to-examination device misregister, means responsive to said second outputs to provide signals adapted to be uniquely combined for different characters to provide character identification signals where the last-mentioned identification signals are for the same characters as the first-mentioned character identification signals but they correspond to unknown characters in different positions on said examination device within said tolerance.

13. The reading machine of claim 11 wherein said inhibiting means initiated at said examination device include upper and lower photosensitive devices in said examination device.

14. The reading machine of claim 11 wherein said examination device is composed of columns and rows of photosensitive members, and said comparator trigger means initiated at said examination device included a column of said photosensitive members, at least some of the photosensitive members of said last mentioned column also providing some of said outputs which detect the presence of elements of the character image or background, and at least one of said photosensitive members of said column constituting a portion of said means to inhibit said comparator.

15. The reading machine of claim 14 wherein the images of the characters are moved selectively from right to left or left to right, and additional trigger means for said comparator and inhibiting means associated with said examination device, said additional means being operative for providing the trigger signal and vertical misregistry signal when the image of the unknown characters moved in one direction whereas the first-mentioned trigger signal means and vertical mis-registry inhibit means are operative when the character image is moving in the opposite direction.

16. In a character reading machine having an examination device including photosensitive means arranged as a first and a second grouping displaced from each other transverse to the direction of relative motion between the examination device and an unknown character, said photosensitive means of each grouping providing electrical outputs corresponding to the optical density of the characters and its background, first analog means connected with said first grouping for summarizing the outputs from preselected parts of said photosensitive means, second analog means connected with said second grouping for summarizing the outputs from preselected parts of said photosensitive means, storage means for the summarized outputs of said first and second means, means to provide a read signal when the character has been examined by said examination device, comparison means for said storage means to identify the unknown character, and means to conduct said read signal to said comparison means to trigger said comparison means.

17. The reading machine of claim 16 wherein said storage means are operative to store signals from said first and second analog means as the character is examined and until said read signal providing means provides said read signal, and means responsive to said read signal to clear said storage means after said comparison means has functioned.

18. The reading machine of claim 16 and means responding to character-to-examination device misregister with both said first and second groupings in a direction transverse to the relative motion between the character and examination device to reject the unknown character.

19. In a character reading machine; an examination device made of a plurality of partially overlapping groupings of photocells arranged as a single mosaic wherein one grouping is displaced in a first direction with respect to a second grouping to allow for registry tolerance as a character image is examined by said groupings of photocells; a plurality of storage devices for the characters; conductive means connected to predetermined photocells of said first and said second groupings and to said storage devices, in a manner such that said storage devices store signals corresponding to the examined character regardless of the position of its image within said registry tolerance afforded by the plural groupings of said photocells of said mosaic; and means to identify the examined character on the basis of the signals stored in said storage devices.

20. The subject matter of claim 19 wherein said means to identify the character include a comparator, and means at said mosaic for providing a comparator trigger signal when the character image has become registered with one of said groupings.

21. The subject matter of claim 19 and means including a portion of the photocells of said mosaic for providing a comparator trigger signal when the image of the character has become registered with at least one of said groupings.

22. The subject matter of claim 21 wherein said mosiac has means including guard photocells for providing a misregistry signal when the character image is located outside of said tolerance.

23. In a character reading machine, an examination device made of at least a first and a second overlapping grouping of photocells arranged as a mosaic, said groupings including a plurality of common photocells used in both groupings while others of the photocells of said mosaic are used exclusively in the first and second grouping, said groupings being thereby displaced to provide character image registry tolerance, character criteria establishing means for the characters, signal conductors connected to said photocells, sets of said conductors connected to said criteria means and with predetermined common photocells and with other photocells of said first grouping in accordance with the character configurations, other sets of conductors connected to said criteria means and with predetermined common photocells and with other photocells of said second grouping in accordance with the character configurations, so that the photocell outputs necessary to define the examined character are provided if the character image registers with either grouping, and means responsive to the character criteria establishing means to identify examined character when its image is within said tolerance.

References Cited by the Examiner

UNITED STATES PATENTS

| | | | |
|---|---|---|---|
| 2,682,043 | 6/54 | Fitch | 235—61.11 |
| 2,786,400 | 3/57 | Peery | 340—146.3 |
| 2,932,006 | 4/60 | Glauberman | 340—149 |
| 2,978,675 | 4/61 | Highleyman | 340—146.3 |
| 3,025,495 | 3/62 | Endres | 235—61.11 |
| 3,069,079 | 12/62 | Steinbuch | 340—146.3 |

MALCOLM A. MORRISON, *Primary Examiner.*

WALTER W. BURNS, JR., *Examiner.*